(12) United States Patent  
Kitamura et al.

(10) Patent No.: US 8,708,299 B2  
(45) Date of Patent: Apr. 29, 2014

(54) SLIDE DEVICE FOR VEHICLE SEAT

(75) Inventors: Atsuo Kitamura, Tokyo (JP); Yutaka Ofuji, Tokyo (JP); Arata Kusunoki, Kanagawa (JP); Yoichi Aoki, Kanagawa (JP)

(73) Assignees: Fuji Jukogyo Kabushiki Kaisha, Tokyo (JP); NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 13/104,391

(22) Filed: May 10, 2011

(65) Prior Publication Data

US 2011/0278420 A1    Nov. 17, 2011

(30) Foreign Application Priority Data

May 11, 2010  (JP) ................................. 2010-109585

(51) Int. Cl.  
*F16M 13/00* (2006.01)

(52) U.S. Cl.  
USPC .......................... 248/429; 248/424; 296/65.01

(58) Field of Classification Search  
USPC .......... 248/419, 420, 424, 429; 296/65.01, 66  
See application file for complete search history.

(56) References Cited

U.S. PATENT DOCUMENTS

| 3,079,118 | A | * | 2/1963 | Pickles .......................... 248/420 |
| 3,841,696 | A | * | 10/1974 | Wagner ....................... 296/65.13 |
| 4,979,716 | A | * | 12/1990 | Holdampf ...................... 248/393 |
| 5,121,895 | A | * | 6/1992 | Ikegaya et al. ................. 248/420 |

FOREIGN PATENT DOCUMENTS

| DE | 4141983 C1 | * | 2/1993 | ............... B60N 2/07 |
| JP | H02-042832 |  | 3/1990 |  |
| JP | 5-124462 |  | 5/1993 |  |
| KR | 2002009239 A | * | 2/2002 | ............... B60N 2/00 |

OTHER PUBLICATIONS

Japanese Office Action relative to JP 2010-109585, dated Mar. 27, 2013—with English translation.

* cited by examiner

*Primary Examiner* — Alfred J Wujciak  
(74) *Attorney, Agent, or Firm* — Smith, Gambrell & Russell, LLP.

(57) ABSTRACT

A slide device for a vehicle seat provided with: an upper rail that is long in the front-rear direction and fixedly installed on the bottom surface of a seat body; a lower rail that is arranged on the floor of a vehicle body and supports the upper rail such that the upper rail can slide in the front-rear direction; a bracket that is fixedly installed at the front of the upper rail and moves downward with thereof when the upper rail moves tilting forward; a J hook member that moves upward with the upper rail upon the upward movement of the rear thereof; and a reinforcement member to which the bracket is abutted upon the downward movement thereof so as to absorb a downward force and to which the J hook member is abutted upon the upward movement thereof so as to absorb an upward force.

17 Claims, 5 Drawing Sheets

SLIDE DEVICE FOR VEHICLE SEAT

CROSS REFERENCES TO RELATED APPLICATIONS

The present application claims priority from Japanese Patent Application No. 2010-109585 filed on May 11, 2010, the entire contents of which are hereby incorporated by reference.

BACKGROUND OF THE INVENTION

1. Field of the Invention

The present invention relates to a slide device for a vehicle seat that moves an upper rail installed on a seat body in the front-rear direction with respect to a lower rail installed on a vehicle body, thereby allowing the seat body to slide in the front-rear direction.

2. Description of the Related Art

A typical slide device for a vehicle seat is mainly configured with a lower rail that is fixedly installed on a floor of a vehicle body and long in the front-rear direction of the vehicle body, and an upper rail that is coupled to the lower rail so as to be relatively movable and supports a seat body. In this type of slide device for the vehicle seat, when a seat belt acts to hold a passenger to the seat upon a crash or the like, the front portion of the upper rail receives a strong force in the direction in which the front portion of the upper rail is to tilt forward with respect to the lower rail. On the other hand, the rear portion of the upper rail receives a strong force in the direction in which the rear portion of the upper rail is to lift upward off the lower rail.

Japanese Unexamined Patent Application Publication No. 1993-124462, for example, discloses a seat track technology that prevents a sliding portion of the upper rail from departing from the lower rail by inserting the sliding portion of the upper rail to a guiding space formed at the lower rail and extending the upper rail from the sliding portion to the outside through an opening formed at the lower rail, providing an engaging projection projecting outward at the edge of the opening of the lower rail and a regulating protrusion engaging with the engaging projection from the both sides at the upper rail, and regulating widening of the opening by the engagement of the engaging projection and the regulating protrusion.

However, the technology disclosed in Japanese Unexamined Patent Application Publication No. 1993-124462 essentially aims to prevent the sliding portion of the upper rail from departing from the lower rail, and cannot cope with the above-mentioned force applied to the front portion of the upper rail in the forward-tilting direction with respect to the lower rail. If this downward force is intensively applied to the front portion of the upper rail, the lower rail may be bent downward into a convex shape, whereby the front-rear movement of the upper rail may be hindered. In particular, in the case of a so-called three-row seating vehicle, which has three rows of seats in a vehicle compartment in the front-rear direction, if the front-rear movement of a seat body in the second row is hindered, it may be difficult for an occupant seated in the third row to escape quickly. In order to address this problem while ensuring a smooth seat slide operation even upon a frontal crash, the lower rail may be composed of a highly rigid material for example, but the enhancement of the rigidity of the lower rail could cause an increase in weight, a steep rise in cost and the like.

SUMMARY OF THE INVENTION

The present invention is made in view of the above, and it is an object of the present invention to provide a slide device for a vehicle seat that has a simple configuration without an enhancement of the rigidity of a lower rail and properly moves a seat body in the front-rear direction even upon a vehicle frontal crash.

A slide device for a vehicle seat according to the present invention includes: a upper rail that is long in the front-rear direction and fixedly installed on the bottom surface of a seat body; a lower rail that is arranged on the floor of a vehicle body and supports the upper rail such that the upper rail can slide in the front-rear direction; a bracket that is fixedly installed at the front of the upper rail and moves downward with the upper rail when the upper rail moves tilting forward; and a bracket receiving member to which the bracket is abutted upon the downward movement thereof so as to absorb a downward force.

According to the slide device for a vehicle seat of the present invention, the seat body can be properly moved in the front-rear direction even upon a vehicle frontal crash by a simple configuration without an enhancement of the rigidity of the lower rail.

BRIEF DESCRIPTION OF THE DRAWINGS

FIG. 2A is a plan view of the slide device; and FIG. B is a left side view of the slide device;

FIG. 5A is a plan view of FIG. 5B; FIG. 5B is a left side view of FIG. 5C; FIG. 5C is a front view; and FIG. 5D is a right side view of FIG. 5C.

DESCRIPTION OF THE PREFERRED EMBODIMENTS

An embodiment of the present invention will hereunder be described with reference to the drawings.

Figure 1:
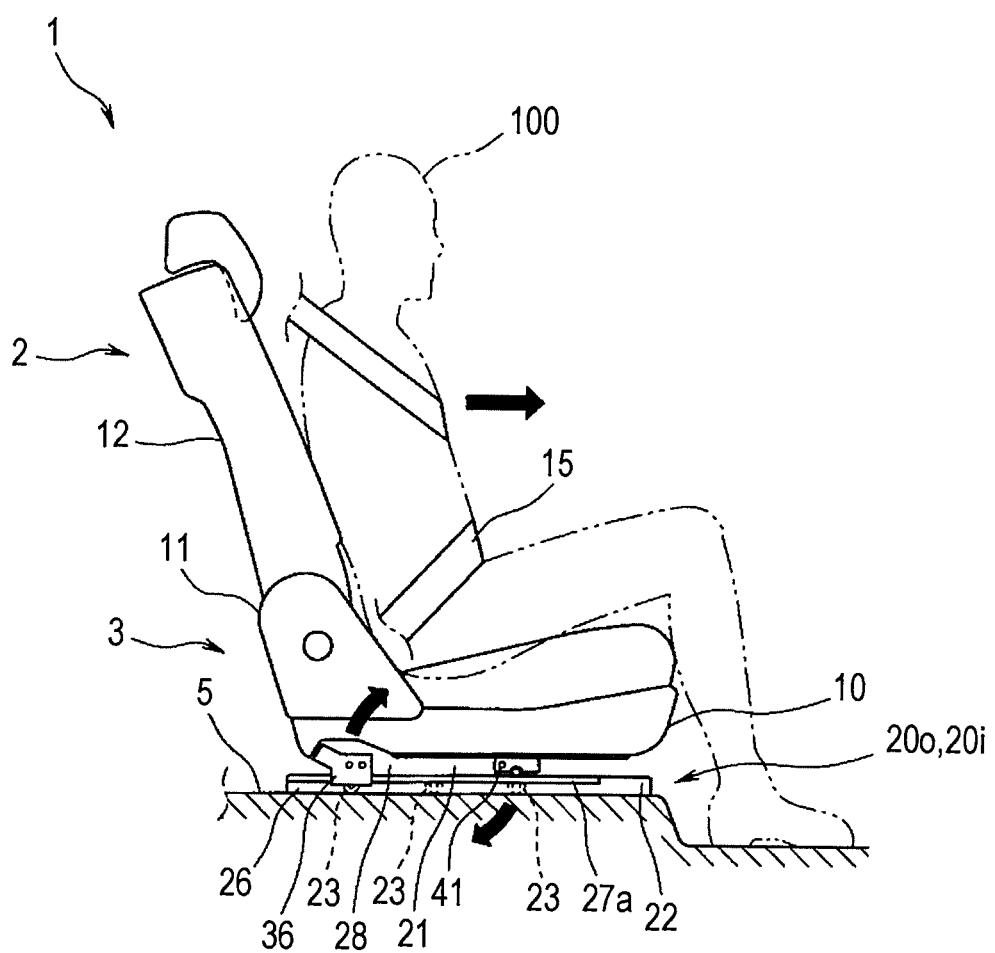
FIG. 1 is a schematic structural view of an entire vehicle seat according to an embodiment of the present invention, the view seen from outside of a vehicle.

In FIG. 1 reference numeral 1 denotes a vehicle seat. The vehicle seat 1 is, for example, a seat that is disposed in the second row of a so-called three-row seating vehicle, which has three rows of seats in a vehicle compartment in the front-rear direction. The seat 1 is configured with a seat body 2, a slide device 3 that supports the seat body 2 on a floor 5 of a vehicle body.

The seat body 2 is configured with a seat cushion 10 on which an occupant 100 is seated, a seat back 12 tiltably connected to a rear portion of the seat cushion 10 via a reclining mechanism 11. A proximal end portion of a seat belt 15 is also connected to the rear portion of the seat cushion 10, the seat belt 15 holding the occupant 100 to the seat body 2 upon a crash or the like (for, example, three-point emergency locking retractor (EFR) seat belt).

The slide device 3 is mainly configured with a left and right pair of slide mechanisms 20o and 20i disposed in parallel in the vehicle width direction. The slide mechanism 20o is disposed on the outside (or outer portion) of a vehicle body side, and the slide mechanism 20i is disposed on in a more central portion or the center side of the vehicle body (FIG. 1 shows only the slide mechanism 20*o* disposed on the side of the vehicle body).

The slide mechanism 20*o* disposed on the outer portion of the vehicle body is configured with an upper rail 21 that is long in the front-rear direction and fixedly installed on the bottom surface of a seat body 2 and a lower rail 22 arranged on the floor 5 of the vehicle body. The lower rail 22 rollably supports a plurality of rollers 23 that arranged in the upper rail 21 (in this embodiment, three rollers 23 are arranged at the front, center and rear of the upper rail 21), thereby allowing the upper rail 21 to slide in the front-rear direction.

Figure 2A:
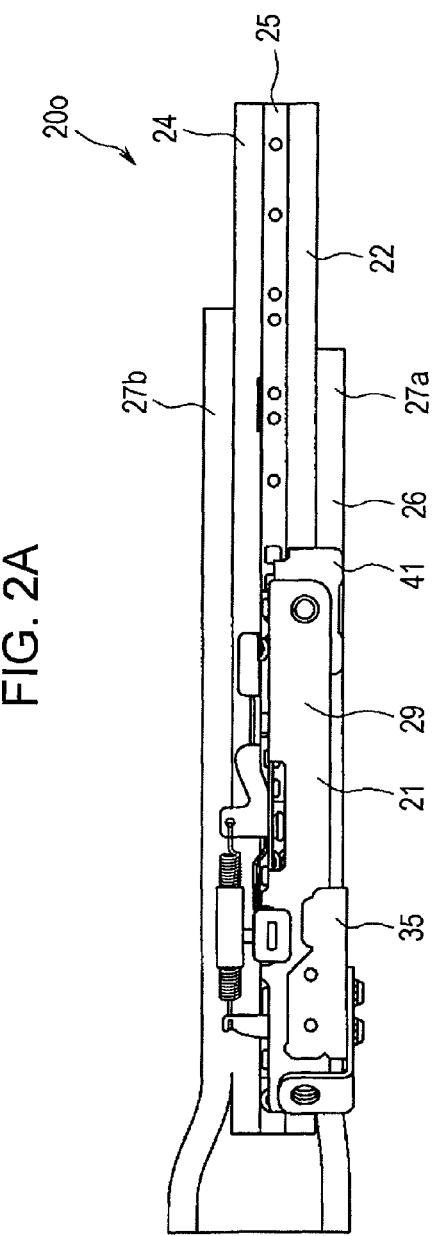
FIGS. 2A and 2B are explanatory views of a slide device according to the embodiment of the present invention.
Figure 2B:
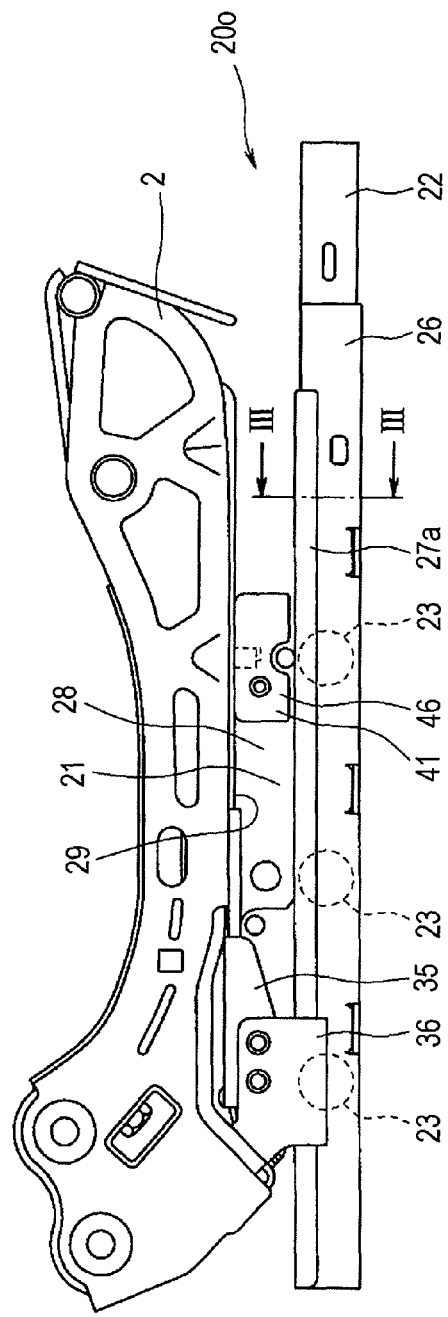
Figure 3:
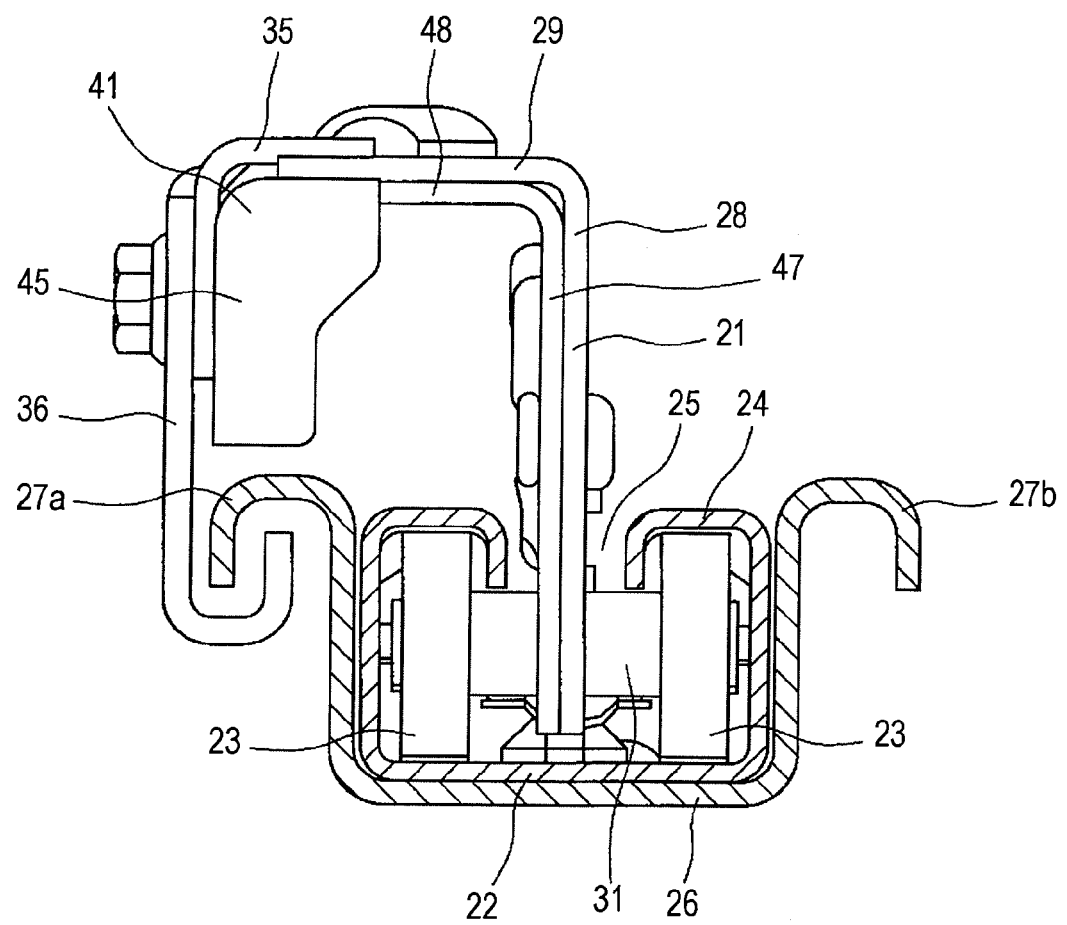
FIG. 3 is a sectional view of the slide device taken along the line III-III of FIG. 2A.

As shown in FIGS. 2A, 2B and 3, the lower rail 22 is composed of a long sheet metal member having a substantially square tube shape. Between top walls 24 of the lower rail 22 is formed a slit 25 linearly extending in a longitudinal direction, via which the inside and the outside of the lower rail 22 are communicated with each other.

A reinforcement member 26 is put outside of a side wall and a bottom wall of the lower rail 22. The reinforcement member 26 is fixed between the side wall of the lower rail 22 and the floor 5. The both ends of the reinforcement member 26 in the longitudinal direction are bent from the rear end to the substantially front end towards outside (opposite side of the lower rail 22), and then bent downward so as to form flange portions 27*a* and 27*b*.

The upper rail 21 is composed of a sheet metal member having a substantially reverse L-shaped cross-section. The upper rail is formed with a vertical wall 28 that is installed in a standing manner inside and outside the lower rail 22, penetrating through the slit 25, and a top wall 29 that is bent from the top of the vertical wall 28 and extends towards the outside of the vehicle body. The upper rail 21 is fixed on the bottom surface of the seat body 2 by fixing the top wall 29 on the bottom surface of the seat body 2.

On the vertical wall 28 of the upper rail 21, roller shafts 31, 31 and 31 are fixed at a front, rear and center of a bottom region to be engaged inside the lower rail 22. A left and right pair of rollers 23, 23 and 23 are pivotally supported at both ends of the roller shafts 31, 31 and 31 individually by bearings.

The pairs of rollers 23, 23 and 23 pivotally supported by the roller shafts 31, 31 and 31 are housed in the lower rail 22 and held between the top walls 24 that are disposed on the left and right sides of the slit 25 and a bottom wall facing substantially parallel to the top walls 24. The upper rail 21 is coupled to the lower rail 22 so as to be relatively movable via the rollers 23, 23 and 23 held in the lower rail 22, whereby the seat body 2 fixedly installed to the top wall 29 of the upper rail 21 can slide in the front-rear direction of the vehicle body.

At the rear of the top wall 29 of the upper rail 21, a hook-attaching bracket 35 is provided, the bracket extending downward and having a substantially L-shaped cross section. By the hook-attaching bracket 35, a J hook member 36 that is made of a metal sheet and has a J-shape cross section is fixed at a position above the roller installed at the substantially rear position, extending downward. A tip of the J hook member 36 that is bent upward extends inside of the flange portion 27*a*. Accordingly, when the J hook member 36 moves upward, the J hook member 36 is abutted to the flange portion 27*a*, thereby regulating the upward movement of the J hook member 36 so as to allow the absorption of an upward force.

Furthermore, a bracket 41 having a substantially cuboid shape is fixed to upper rail 21 in a area surrounded by the vertical wall 28 and top wall 29 at a position above the roller 23 installed at the substantially front of the upper rail 21.

Figure 4:
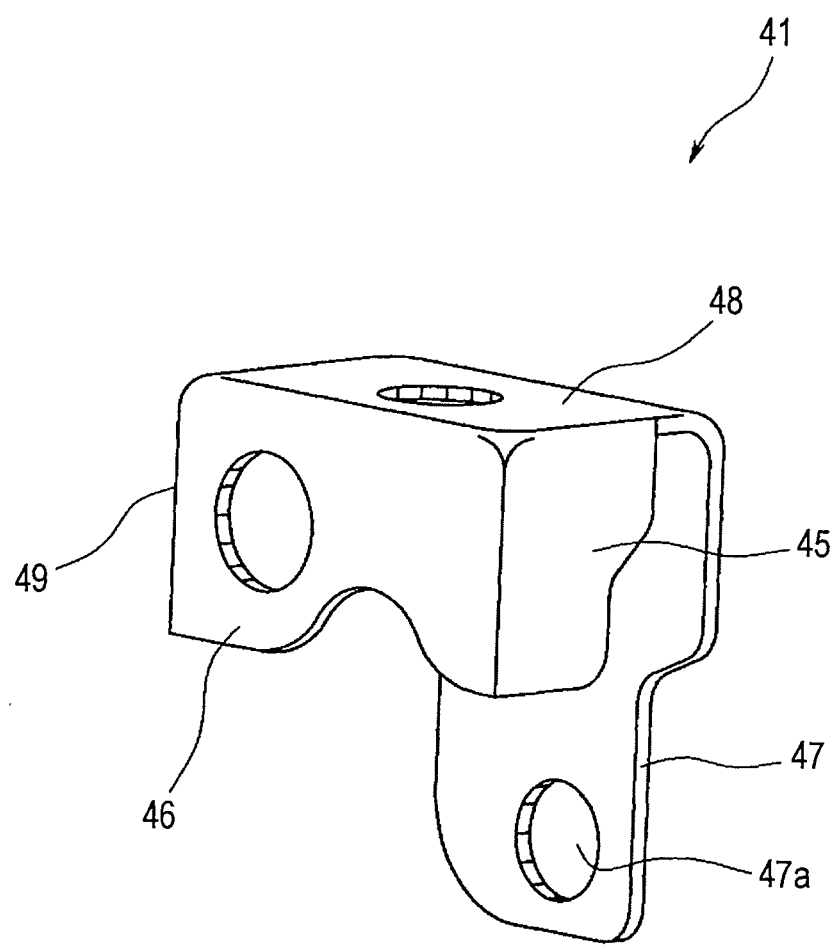
FIG. 4 is a perspective view of a bracket according to the embodiment of the present invention.
Figure 5A:
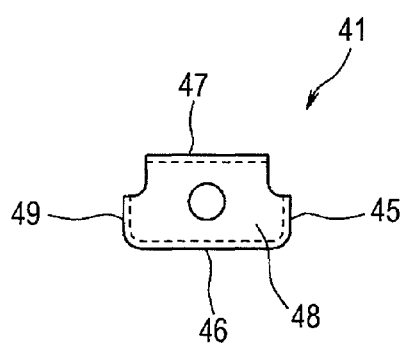
FIGS. 5A to 5D is explanatory views of the bracket according to the embodiment of the present invention.
Figure 5B:
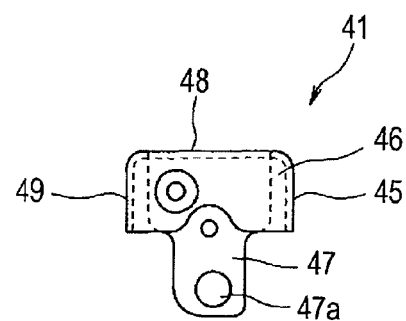
Figure 5C:
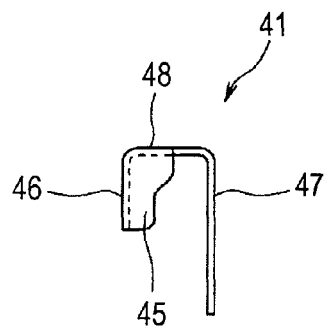
Figure 5D:
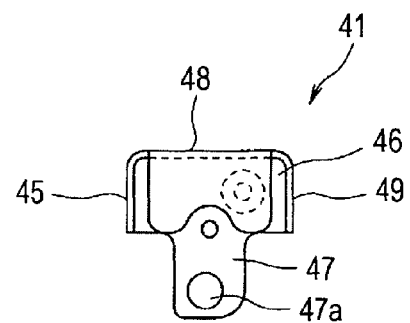

As shown in FIGS. 4 and 5, the bracket 41 is formed with a front surface 45, a right surface 46, a left surface 47, an upper surface 48 and a rear surface 49. The bottom part of the bracket 41 facing the flange portion 27*a* of the reinforcement member 26 is left open. The bracket 41 is fixed to the upper rail 21 by fixing the left surface 47 and the upper surface 48 along the inside of the vertical wall 28 and the top wall 29.

The left surface 47 of the bracket 41 is formed so as to extend downward. This downward extending portion has a hole 47*a* for inserting the roller shaft 31 of the front roller 23.

The front surface 45 and the rear surface 49 of the bracket 41 are formed such that the bottom ends thereof are located above the flange portion 27*a* of the reinforcement member 26 and the widths of the bottom ends are narrower than the width of the flange portion 27*a*. Accordingly, when the upper rail 21 tilts forward, the bracket 41 moves downward along with the forward-tilting movement of the upper rail 21, and the bottom end of the front surface 45 of the bracket 41 is abutted to the flange portion 27*a* of the reinforcement member 26, thereby regulating the downward movement of the bracket 41 so as to allow the absorption of an downward force.

As described above, in the present embodiment the rear end of the flange 27*a* of the reinforcement member 26 is provided as a J hook receiving member and the front end of the flange 27*a* of the reinforcement member 26 is provided as a bracket receiving member.

Upon a frontal crash or the like, an impact load applied to the occupant 100 sitting on the vehicle seat 1 according to the present embodiment configured in the above manner is transmitted to the seat belt 15 and the like as shown with an arrow in FIG. 1, for example. Then a load is applied to the upper rail 21, the load working to move the front end thereof downward and the rear end thereof upward. Therefore, in most cases in which the lower rail 22 is bent upon a frontal crash, the lower rail 22 is bent downward into a convex shape.

However, on the rear side of the slide mechanism 20*o* according to the present embodiment, a force working to move upward is dispersed to the rear side of the top walls 24 of the lower rail 22 via the roller 23 in the rear side and the rear portion of the flange 27*a* of the reinforcement member 26. Furthermore, on the front side of the slide mechanism 20*o*, a force working to move downward is dispersed to the bottom wall of the lower rail via the roller 23 in the front side and an upper area of the flange 27*a* of the reinforcement member 26, the area being in proximity to the roller 23. In this manner, the forces applied to the slide mechanism 20*o* upon a frontal crash are dispersed on the both front side and rear side thereof and are not transmitted intensively to the lower rail 22. Therefore, the lower rail 22 is reliably prevented from being bent downward into a convex shape without the enhancement of the rigidity of the lower rail 22, whereby the seat body can properly slide in the front-rear direction even upon a frontal crash.

Especially in the front side of the slide mechanism 20*o* of the present embodiment, a large effect can be obtained in preventing the lower rail 22 from being bent by simply adding the bracket 41 for dispersing the applied forces to the reinforcement 26, which can be easily applied to a conventional slide mechanism and has high versatility.

While the slide mechanism 20*o* which is arranged on the side of the vehicle body side has been explained in the present embodiment, the slide mechanism 20*i* arranged on the side of the vehicle body center may also be equipped with both a J hook member 36 and a bracket 41. In addition, only either of the J hook member 36 or the bracket 41 mechanism may be used as far as sufficient strength is secured.

What is claimed is:

1. A slide device for a vehicle seat comprising:
    an upper rail that extends in a front-rear direction and is configured to be fixedly installed on a bottom surface of a seat body;
    a lower rail that is configured to be supported by the floor of a vehicle body, and to support the upper rail such that the upper rail can slide in the front-rear direction;
    a bracket that is fixedly installed at the front of the upper rail and moves downward with the upper rail when the upper rail moves tilting forward;
    a bracket receiving member to which the bracket is abutted upon the downward movement of the bracket so as to absorb a downward force;
    a J hook member that has a J-shape cross section, is fixed at a rear position of the upper rail, and moves upward along with the upper rail when a rear portion of the upper rail moves upward; and
    a J hook receiving member to which the J hook member is abutted upon the upward movement of the J hook member so as to absorb an upward force,
    wherein the upper part of lower rail includes the bracket receiving member and the lower part of lower rail includes the J hook receiving member.

2. The slide device for a vehicle seat according to claim 1, wherein the bracket receiving member includes an extension of the J hook receiving member forward along the front-rear direction.

3. The slide device for a vehicle seat according to claim 2, wherein said slide device represents at least one of a first rail set and a second rail set, with the first and second rail sets being configured to be disposed on the floor of the vehicle body, respectively, and the bracket and the bracket receiving member are disposed at least on one of the first and second rail sets.

4. The slide device for a vehicle seat according to claim 1, wherein said slide device represents at least one of a first rail set and a second rail set, with the first and second rail sets being configured to be disposed on the floor of the vehicle body, respectively, and the bracket and the bracket receiving member are disposed at least on one of the first and second rail sets.

5. The slide device for a vehicle seat according to claim 4 wherein the bracket and bracket receiving member are formed at least on the first rail set.

6. A slide device assembly comprising the slide device of claim 1 and a vehicle body, with said slide device being fixed to said vehicle body.

7. The slide device assembly of claim 6, further comprising a vehicle seat secured to said slide device.

8. A slide device assembly comprising the slide device of claim 1 and a vehicle seat, with said slide device being fixed to said vehicle seat.

9. The slide device for a vehicle seat according to claim 1, wherein a portion of said bracket that tilts into contact with said bracket receiving member is arranged such that the portion of said bracket is adjustable between a first mode wherein the portion of the bracket is spaced vertically and free from contact with said bracket receiving member and a second mode wherein, upon being tilted forward, said bracket comes into contact with said bracket receiving member.

10. The slide device for a vehicle seat according to claim 1 further comprising a roller assembly which is connected to said bracket.

11. The slide device for a vehicle seat according to claim 10 wherein the roller assembly is configured to roll along in contact with a surface of the lower rail.

12. The slide device for a vehicle seat according to claim 1 wherein the bracket is positioned and configured as to be spaced above the bracket receiving member until the downward movement with the upper rail and the abutment of the bracket with the bracket receiving member.

13. A slide device for a vehicle seat comprising:
    an upper rail that extends in a front-rear direction and is configured to be fixedly installed on a bottom surface of a seat body;
    a lower rail that is configured to be supported by the floor of a vehicle body, and to support the upper rail such that the upper rail can slide in the front-rear direction;
    a bracket that is fixedly installed at the front of the upper rail and moves downward with the upper rail when the upper rail moves tilting forward;
    a bracket receiving member to which the bracket is abutted upon the downward movement of the bracket so as to absorb a downward force; and
    a roller assembly which is connected to said bracket,
    wherein the roller assembly is configured to roll along in contact with a surface of the lower rail, and
    wherein the roller assembly includes a pair of rollers and a shaft extending between said rollers and received by said bracket,
    wherein the lower rail includes the bracket receiving member.

14. A slide device for a vehicle seat comprising:
    an upper rail that extends in a front-rear direction and configured to be fixedly installed on a bottom surface of a seat body;
    a lower rail that is configured to be supported by the floor of a vehicle body, and to support the upper rail such that the upper rail can slide in the front-rear direction;
    a bracket that is fixedly installed at the front of the upper rail and moves downward with the upper rail when the upper rail moves tilting forward;
    a bracket receiving member to which the bracket is abutted upon the downward movement of the bracket so as to absorb a downward force, and wherein a center portion of the bracket is closer to the front end of the upper rail than to a central point of the upper rail relative to the front-rear direction;
    a J hook member that has a J-shape cross section, is fixed at a rear portion of the upper rail, and moves upward along with the upper rail when a rear portion of the upper rail moves upward; and
    a J hook receiving member to which the J hook member is abutted upon the upward movement of the J hook member so as to absorb an upward force,
    wherein the upper part of lower rail includes the bracket receiving member and the lower part of lower rail includes the J hook receiving member.

15. The slide device for a vehicle seat according to claim 14, wherein the bracket receiving member includes an extension of the J hook receiving member forward along the front-rear direction.

16. The slide device for a vehicle seat according to claim 14 wherein the bracket is positioned and configured as to be spaced above the bracket receiving member until the downward movement with the upper rail and the abutment of the bracket with the bracket receiving member.

17. The slide device for a vehicle seat according to claim 16 wherein the bracket receiving member includes a flange portion extending below and spaced from the bracket when the bracket is in an untilted state.

* * * * *